(12) United States Patent
Klein et al.

(10) Patent No.: US 6,722,739 B2
(45) Date of Patent: Apr. 20, 2004

(54) FITTING FOR A VEHICLE SEAT

(75) Inventors: Mario Klein, Blumberg (DE); Martin Kraus, Katzenbach (DE); Eckhard Nock, Worms (DE)

(73) Assignee: Keiper GmbH & Co. KG., Kaiserslautern (DE)

( * ) Notice: Subject to any disclaimer, the term of this patent is extended or adjusted under 35 U.S.C. 154(b) by 0 days.

(21) Appl. No.: 10/256,472

(22) Filed: Sep. 27, 2002

(65) Prior Publication Data

US 2003/0062755 A1 Apr. 3, 2003

(30) Foreign Application Priority Data

Sep. 29, 2001 (DE) .......................... 101 48 375

(51) Int. Cl.⁷ ................................. B60N 2/02
(52) U.S. Cl. ...................................... 297/367
(58) Field of Search ................ 297/367, 366, 297/368

(56) References Cited

U.S. PATENT DOCUMENTS

| 4,087,885 | A | * | 5/1978 | Gillentine | 16/325 |
| 4,836,608 | A | * | 6/1989 | Sugiyama | 297/367 |
| 5,154,476 | A | * | 10/1992 | Haider et al. | 297/367 |
| 5,899,533 | A | * | 5/1999 | Tatematsu et al. | 297/367 |
| 6,033,022 | A | * | 3/2000 | Bauer et al. | |
| 6,139,105 | A | * | 10/2000 | Morgos et al. | 297/378.12 |
| 6,209,955 | B1 | * | 4/2001 | Seibold | 297/216.13 |
| 6,540,232 | B2 | * | 4/2003 | Hansel et al. | |
| 6,540,297 | B2 | * | 4/2003 | Hansel et al. | |
| 2002/0008419 | A1 | * | 1/2002 | Boltze et al. | 297/367 |
| 2003/0015904 | A1 | * | 1/2003 | Hansel et al. | |
| 2003/0042780 | A1 | * | 3/2003 | Klein et al. | |
| 2003/0160490 | A1 | * | 8/2003 | Nock | 297/367 |

FOREIGN PATENT DOCUMENTS

EP 0928717 A1 7/1999

* cited by examiner

Primary Examiner—Peter M. Cuomo
Assistant Examiner—Sarah C. Burnham
(74) Attorney, Agent, or Firm—Alston & Bird LLP

(57) ABSTRACT

In the case of a fitting (5) for a vehicle seat, in particular for a motor vehicle seat, having a first fitting part (7) which defines an at least partially closed structural space (7'), a second fitting part (8) which can be pivoted relative to the first fitting part (7), two locking elements (12, 15) which are effective between the fitting part (7, 8), and a control element (24) which is assigned to the one fitting part (8) and is arranged within the structural space (7'), for controlling the interaction between the locking elements (12, 15), in a partially-assembled state of the fitting (5) the control element (24) can be placed from outside the fitting (5) into the structural space (7') and can be attached to the fitting part (8) assigned to it.

42 Claims, 2 Drawing Sheets

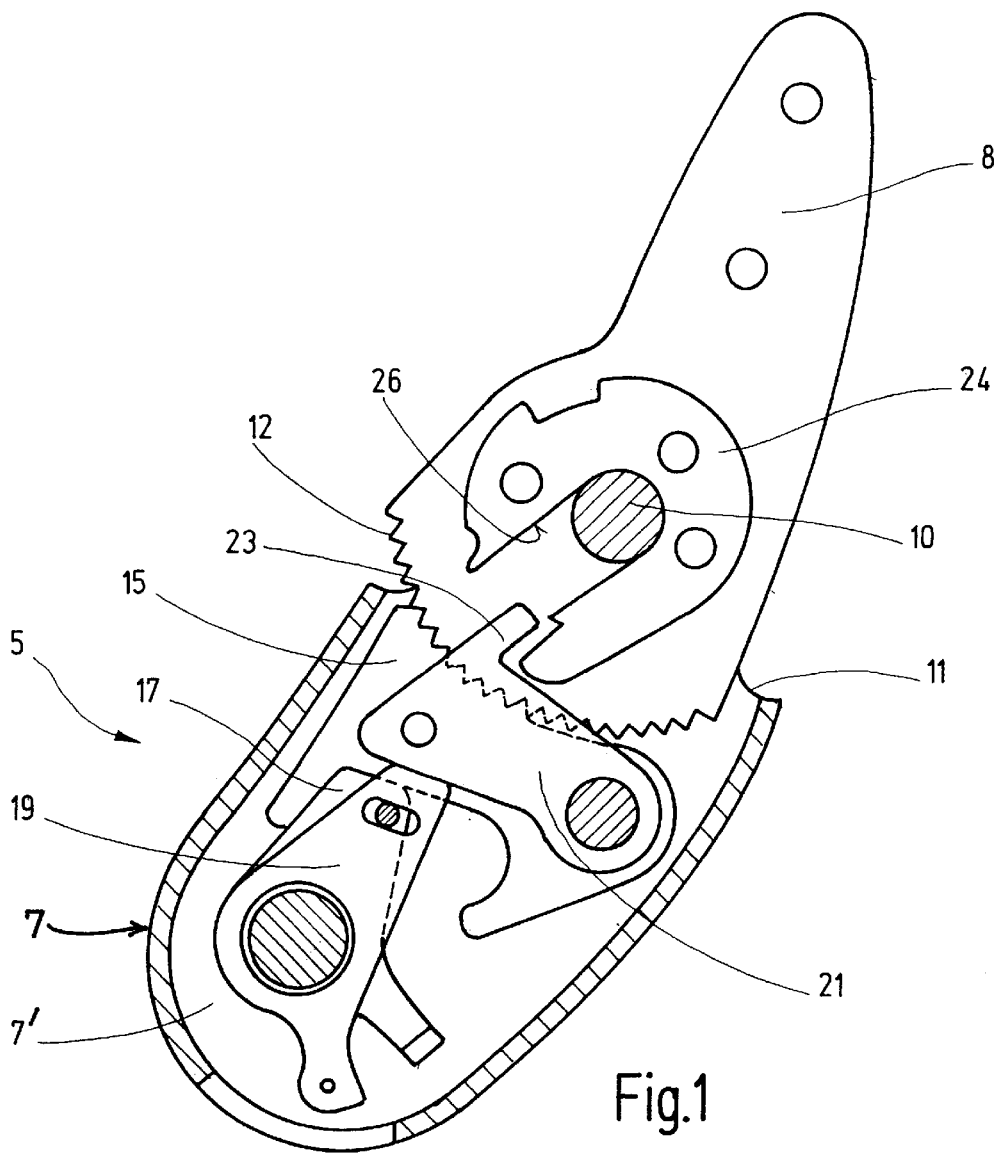

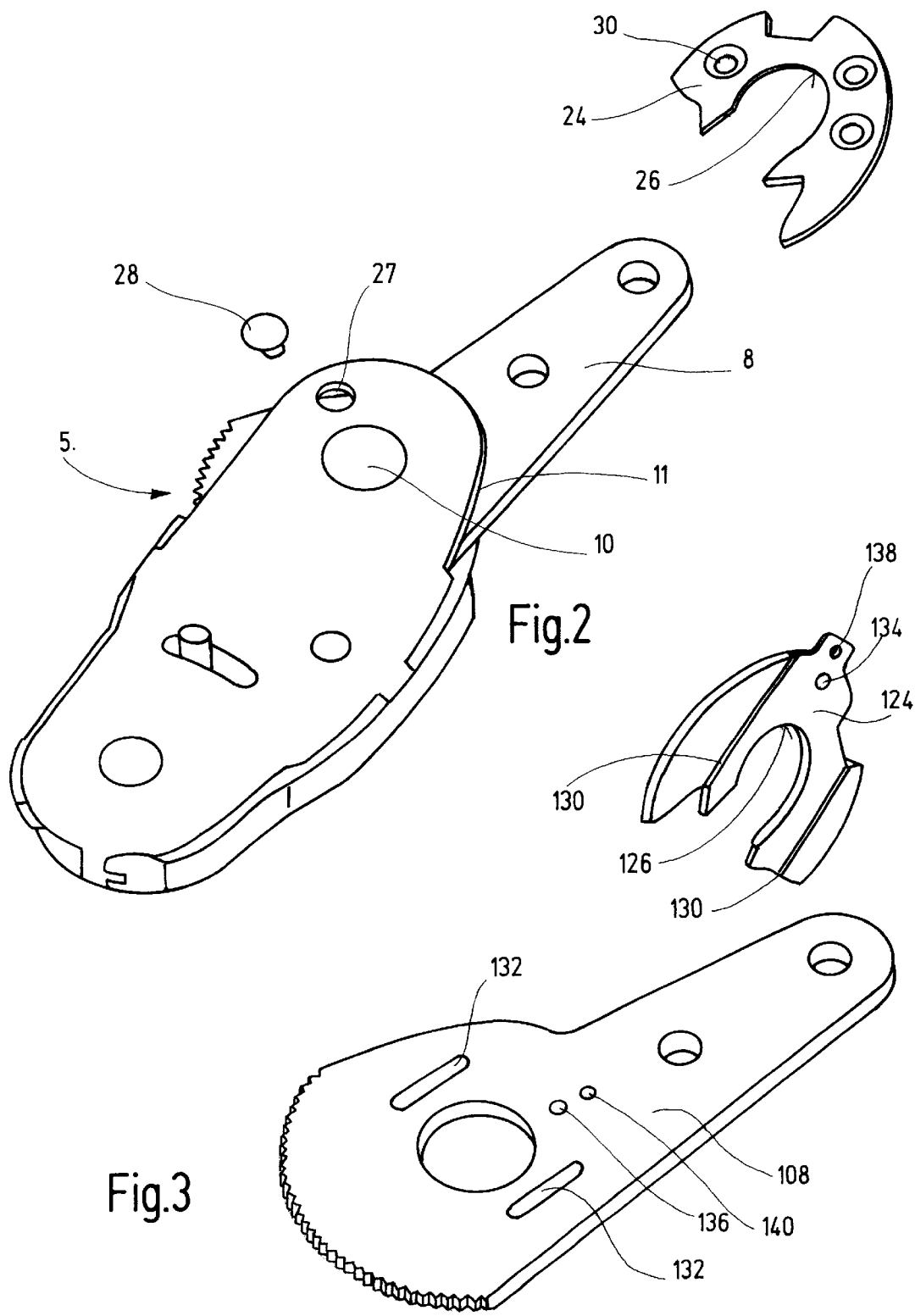

FITTING FOR A VEHICLE SEAT

BACKGROUND OF THE INVENTION

The present invention relates to a fitting for a vehicle seat, in particular for a motor vehicle seat, having a first fitting part which defines an at least partially closed structural space, a second fitting part which can be pivoted relative to the first fitting part, two locking elements which are effective between the fitting parts, and a control element which is assigned to the second fitting part and is arranged within the structural space, for controlling the interaction between the locking elements.

EP 0 928 717 A1 discloses a fitting which is locked in the various seat positions of the backrest by interaction of a toothed rim on the fitting upper part and a pivotable blocking pawl on the fitting lower part. The toothed rim does not extend to such an extent that the blocking pawl is able to engage in the toothed rim in a table position of the backrest, in which it is pivoted forward. Instead, a plate which is fixed on the fitting upper part is supported by a sensing element which simultaneously controls the floor-locking means for transfer into a package position.

In order, for example, also to permit locking in a table position, in the case of a fitting of the type mentioned at the beginning, the plate is developed as a control element which controls the interaction of the locking elements in all of the possible positions of the backrest.

BRIEF SUMMARY OF THE INVENTION

One aspect of the present invention is the provision of an improved fitting for a vehicle seat, in particular for a motor vehicle seat. In accordance with one aspect of the present invention, the fitting includes a first fitting part which defines an at least partially closed structural space (e.g., an at least partially closed chamber), a second fitting part which can be pivoted relative to the first fitting part, locking elements which are effective between the fitting parts for selectively allowing and restricting pivoting of the second fitting part relative to the first fitting part, and a control element which is assigned to the second fitting part and is arranged within the structural space for controlling interaction between the locking elements. In accordance with this aspect, in a partially-assembled state of the fitting, the control element can be placed from outside the fitting into the structural space and can be attached to the second fitting part.

Because it being possible, in a partially-assembled state of the fitting, to place the control element from outside the fitting into the structural space and to attach it to the fitting part assigned to it, the production of the fitting up to the partially-assembled state can proceed in an identical manner for all of the applications, i.e. with the same production line. This reduces the cost of production of the fitting. The control element, which is put in at the end, is then coordinated to the application, i.e. preferably a plurality of interchangeable control elements are produced which are of identical design with regard to the possibility of attaching them to the fitting part, but differ in their active surfaces, for example in the outer circumference, with the result that the fitting can be used for different types of vehicle seats.

The control element is, for example, a control plate which is attached to the second fitting part and is arranged at least partially around the backrest bolt, it being possible for the second fitting part to be pivoted relative to the first fitting part by means of the backrest bolt. For a form-fitting bearing against the backrest bolt, an outwardly open socket is preferably provided, which socket extends in the radial direction from the outer circumference of the control plate as far as its center. The control plate can then be pushed through an opening in the structural space onto the backrest bolt, for example adjacent to the second fitting part.

As a guiding aid during installation and for transmitting torques between the second fitting part and the control plate, steps, grooves or other depressions and guide elevations, knobs, lumps, projections or other elevated portions interacting therewith may be provided. The rotationally fixed and displacement-secure fastening of the control plate to the second fitting part preferably takes place by means of fastening means, for example grooved drive studs or expanding rivets, which can be placed into the structural space, for example through an installation opening of the first fitting part.

BRIEF DESCRIPTION OF THE DRAWINGS

The invention is explained in greater detail below with reference to two exemplary embodiments illustrated in the drawings, in which:

FIG. 1 shows a section through the first exemplary embodiment,

FIG. 2 shows a perspective illustration of the first exemplary embodiment before installation of the control plate, FIG. 3 shows a perspective illustration of the control plate and of the fitting upper part of the second exemplary embodiment, and FIG. 4 shows a schematic illustration of a vehicle seat.

DETAILED DESCRIPTION OF THE INVENTION

The present invention now will be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements.

A vehicle seat 1 for a motor vehicle has a seat part 3 and a backrest 4. The alignment of the vehicle seat 1 in the motor vehicle and the customary direction of travel thereof determine the directional data used below. On both vehicle seat sides, the backrest 4 is attached to the seat part 3 by means of a fitting 5 and can be adjusted in its inclination.

The fitting 5 according to the first exemplary embodiment has a fitting lower part 7, which is fixed on the seat part, and a fitting upper part 8, which is fixed on the backrest and is mounted in a manner such that it can be pivoted relative to the fitting lower part 7 by means of a backrest bolt 10. The fitting lower part 7 comprises two flat, elongated, spaced-apart parts which are connected to each other at the longitudinal edge and define between them a structural space 7' (e.g., an at least partially closed chamber) for receiving the fitting upper part 8 and various locking and securing elements. On the side facing upward, the fitting lower part 7 is designed to be largely open, which is referred to in the following as an opening 11. During installation, the fitting upper part 8 is introduced into this opening.

For the locking of the fitting 5, there is formed on the fitting upper part 8, in the region arranged below the backrest bolt 10, a toothed rim 12 which is curved around the backrest bolt 10 and interacts with a blocking pawl 15, which is mounted pivotably on the fitting lower part 7. On that side of the blocking pawl 15 which faces away from the toothed rim 12, an intercepting element 17 which, in the event of a crash, supports the blocking pawl 15 is mounted pivotably on the fitting lower part 7. A spring-loaded clamping element 19, which is likewise mounted pivotably on the fitting lower part 7 and is of eccentrically curved design, normally secures the blocking pawl 15 in the locked position. For this purpose, the clamping element 19 bears against a control cam 21 which is connected in a rotationally fixed manner to the locking pawl 15.

The control cam 21 is provided at the same time with a control finger 23 which interacts with a control plate 24 attached to the fitting upper part B. The control plate 24 is designed as an interrupted ring which is interrupted by a socket 26 which extends from the outer circumference of the control plate 24 into its center and is intended for the backrest bolt 10. The socket 26 has a semicircularly curved base and parallel flanks adjoining the base tangentially, with the distance between the flanks of the socket 26 corresponding to the diameter of the backrest bolt 10 and, in the fully assembled state, the backrest bolt 10 being arranged on the base of the socket 26 in the center of the control plate 24. Along its outer circumference, the control plate 24 has regions which differ in extent in the radial direction and which correspond to different positions of the backrest 4. In response to interaction between the control plate 24 and the control finger 23, the blocking pawl 15 is able to be engaged or not engaged, and the pivoting region of the fitting upper part 8 is restricted.

The control plate 24 is coordinated individually to the application and, according to the invention, is fitted as the last component into the partially-assembled fitting 5, which is of identical construction for all of the applications. For this purpose, the control plate 24 is introduced from above along the fitting upper part 8 into the opening 11 in the fitting lower part 7, the socket 26 being pushed over the backrest bolt 10 until the backrest bolt bears against the base of the socket 26. Provided in an upper region of the fitting lower part 7, at a small distance from the backrest bolt 10, is an installation opening 27, through which three grooved drive studs 28 can be introduced one after another, after the fitting upper part 8 has been pivoted. The grooved drive studs 28 reach through holes 30 in the control plate 24 and are placed into the fitting upper part 8 in such a manner that the control plate 24 is connected to the fitting upper part 8 in a rotationally fixed and non-displaceable manner. Thus the fully-assembled state of the fitting 5 is reached.

The second exemplary embodiment corresponds, insofar as it is not described differently below, with the first exemplary embodiment; therefore, parts which are identical and act in an identical manner bear reference numbers which are increased by 100. The control plate 124 has a respective groove 130 on both sides of its socket 126 parallel to the flanks thereof. The two grooves 130 are used for receiving two guide elevations 132 which are integrally formed on the fitting upper part 108. During the fitting of the control plate 124, the guide elevations 132 are used as a means of facilitating installation and, during use, are used for the rotationally fixed connection between the fitting upper part 108 and the control plate 124. As a further installation aid, in particular if the backrest bolt is only fitted at a later point, a latching knob 134 is formed, for example is pushed out, on the control plate 124 and interacts in a form-fitting manner with a latching cavity 136 on the fitting upper part 108 when the control plate 124 is fitted.

The fitting of the control plate 124 takes place in a similar manner as in the first exemplary embodiment, by introduction along the fitting upper part 108 into the partially-assembled fitting (not illustrated in detail) until the socket 126 bears against the backrest bolt or the latching knob 134 enters into the latching cavity 136. For axially holding the control plate 124 and fitting upper part 108 together, a region which protrudes upward in a tab-like manner over the fitting lower part and in which a hole 138 is provided is integrally formed on the upper end of the control plate 124. A suitable fastening means, for example a grooved drive stud, can then be inserted through this hole 138 and placed into the fitting upper part 108, for example into a depression 140 or a blind hole.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A fitting for a vehicle seat, comprising:
   a first fitting part which defines an at least partially closed chamber;
   a second fitting part mounted for pivoting relative to the first fitting part while the fitting is in a fully-assembled state;
   a backrest bolt mounted for enabling the pivoting of the second fitting part relative to the first fitting part;
   a plurality of locking elements which interact with each other and are effective between the first and second fitting parts for selectively allowing and restricting pivoting of the second fitting part relative to the first fitting part; and
   a control element attached to the second fitting part and arranged within the chamber for controlling interaction between the locking elements while the fitting is in the fully-assembled state, wherein:
      the control element and an opening of the chamber are configured so that the control element can initially be moved relative to each of the locking elements and the first and second fitting parts, and into the chamber via the opening, while the fitting is in a partially-assembled state,
      the second fitting part is mounted for pivoting relative to the first fitting part while the fitting is in the partially-assembled state,
      the control element is separate from, and movable relative to, each of the locking elements and the first and second fitting parts prior to the partially-assembled state,
      the control element is a control plate that is arranged at least partially around the backrest bolt while the fitting is in the fully-assembled state, and
      the control plate has an outwardly open socket, and the backrest bolt is positioned in the socket while the fitting is in the fully-assembled state.

2. A fitting according to claim 1, wherein the control plate is attached to the second fitting part by at least one fastener.

3. A fitting according to claim 1, wherein the control plate is a first control plate that can be exchanged with a similar, second control plate, with the second control plate having a different circumferential structure than the first control plate.

4. A fitting according to claim 1, wherein the fitting is in combination with the vehicle seat, with the fitting being mounted between a seat part of the vehicle seat and a backrest of the vehicle seat for adjusting an inclination of the backrest relative to the seat part.

5. A fitting according to claim 1, wherein the plurality of locking elements consists of two locking elements.

6. A fitting according to claim 5, wherein the two locking elements includes:
   a toothed rim of the second fitting part, and
   a locking pawl which is pivotably mounted to the first fitting part and includes teeth for engaging the toothed rim to restrict pivoting of the second fitting part relative to the first fitting part.

7. A fitting according to claim 5, further comprising a control cam which is pivotably mounted to the first fitting part and includes at least one protrusion which extends into the socket of the control plate for enabling the controlling of the interaction between the locking elements while the fitting is in the fully-assembled state.

8. A fitting for a vehicle seat, comprising:
   a first fitting part which defines an at least partially closed chamber;
   a second fitting part mounted for pivoting relative to the first fitting part while the fitting is in a fully-assembled state;
   a backrest bolt mounted for enabling the pivoting of the second fitting part relative to the first fitting part;
   a plurality of locking elements which interact with each other and are effective between the first and second fitting parts for selectively allowing and restricting pivoting of the second fitting part relative to the first fitting part; and
   a control element attached to the second fitting part and arranged within the chamber for controlling interaction between the locking elements while the fitting is in the fully-assembled state, wherein:
      the control element and an opening of the chamber are configured so that the control element can initially be moved relative to the second fitting part and into the chamber via the opening while the fitting is in a partially-assembled state,
      the second fitting part is mounted for pivoting relative to the first fitting part while the fitting is in the partially-assembled state,
      the control element is a control plate that is arranged at least partially around the backrest bolt,
      the control plate has an outwardly open socket, and the backrest bolt is positioned in the socket, and
      the socket extends radially outward from proximate a center of the control plate to an outer circumference of the control plate.

9. A fitting according to claim 8, wherein the control plate is adjacent the second fitting part, with the socket defining a width that is at least as large as a diameter of the backrest bolt so that the control plate can initially be pushed onto the backrest bolt adjacent to the second fitting part.

10. A fitting according to claim 8, wherein the plurality of locking elements consists of two locking elements.

11. A fitting according to claim 8, wherein the control plate is a first control plate that can be exchanged with a similar, second control plate, with the second control plate having a different circumferential structure than the first control plate.

12. A fitting according to claim 8, wherein the fitting is in combination with the vehicle seat, with the fitting being mounted between a seat part of the vehicle seat and a backrest of the vehicle seat for adjusting an inclination of the backrest relative to the seat part.

13. A fitting for a vehicle seat, comprising:
   a first fitting part which defines an at least partially closed chamber;
   a second fitting part mounted for pivoting relative to the first fitting part while the fitting is in a fully-assembled state;
   a plurality of locking elements which interact with each other and are effective between the first and second fitting parts for selectively allowing and restricting pivoting of the second fitting part relative to the first fitting part; and
   a control element attached to the second fitting part and arranged within the chamber for controlling interaction between the locking elements while the fitting is in the fully-assembled state, wherein:
      the control element and an opening of the chamber are configured so that the control element can initially be moved relative to the second fitting part and into the chamber via the opening while the fitting is in a partially-assembled state,
      the second fitting part is mounted for pivoting relative to the first fitting part while the fitting is in the partially-assembled state,
      the control plate is attached to the second fitting part by at least one fastener, and
      the first fitting part has an installation opening, and the installation opening and the fastener are sized and arranged so that the fastener can be placed through the installation opening while the fastener is being installed to the control plate and the second fitting part.

14. A fitting according to claim 13, further comprising a backrest bolt mounted for enabling the pivoting of the second fitting part relative to the first fitting part, wherein the control element is a control plate that is arranged at least partially around the backrest bolt.

15. A fitting according to claim 13, wherein the control plate is adjacent the second fitting part, one of the control plate and the second fitting part includes at least one depression, the other of the control plate and the second fitting part includes at least one elevated portion, and the depression and the elevated portion engage one another for at least one of:
   attaching the control element to the second fitting part, and
   guiding the control element relative to the second fitting part.

16. A fitting according to claim 13, the plurality of locking elements consists of two locking elements.

17. A fitting according to claim 13, wherein the control plate is a first control plate that can be exchanged with a similar, second control plate, with the second control plate having a different circumferential structure than the first control plate.

18. A fitting according to claim 13, wherein the fitting is in combination with the vehicle seat, with the fitting being mounted between a seat part of the vehicle seat and a backrest of the vehicle seat for adjusting an inclination of the backrest relative to the seat part.

19. A method of assembling a vehicle-seat fitting, comprising:
   installing a plurality of locking elements within an at least partially closed chamber of a first fitting part so that the locking elements are operative for interacting with each other and are effective between the first fitting part and a second fitting part for selectively allowing and restricting pivoting of the second fitting part relative to the first fitting part;

providing a control element that is at least initially separate from, and movable relative to, each of the locking elements and the first and second fitting parts; and then installing the control element, including:

moving the control element from a position outside of the chamber to a position within the chamber by passing the control element through an opening of the chamber, with the moving of the control element including moving the control element relative to each of the locking elements and the first and second fitting parts, and then attaching the control element to the second fitting part so that the control element is operative for controlling the interaction between the locking elements.

20. A method according to claim 19, wherein:

the method comprises mounting a backrest bolt between the first and second fitting parts, the control element is a control plate, and the moving of the control element includes arranging the control element at least partially around the backrest bolt.

21. A method according to claim 20, wherein the installing of the control plate includes positioning the backrest bolt in an outwardly open socket of the control plate.

22. A method according to claim 21, wherein the positioning of the backrest bolt includes pushing the control plate onto the backrest bolt at a position adjacent the second fitting part.

23. A method according to claim 20, wherein the mounting of the second fitting part further includes introducing the second fitting part into the opening of the chamber.

24. A method according to claim 19, wherein the control element is a first control plate, and the method further comprises selecting the first control plate from a plurality of control plates having different circumferential structures.

25. A method according to claim 19, further comprising:

mounting the fitting between a seat part of a vehicle seat and a backrest of the vehicle seat; and then operating the fitting to adjust an inclination of the backrest relative to the seat part.

26. A method according to claim 19, wherein the plurality of locking elements consists of two locking elements.

27. A method of assembling a vehicle-seat fitting, comprising:

installing a plurality of locking elements within an at least partially closed chamber of a first fitting part so that the locking elements are operative for interacting with each other and are effective between the first fitting part and a second fitting part for selectively allowing and restricting pivoting of the second fitting part relative to the first fitting part; and then installing a control element, including moving the control element from a position outside of the chamber to a position within the chamber by passing the control element through an opening of the chamber, and attaching the control element to the second fitting part so that the control element is operative for controlling the interaction between the locking elements;

wherein:

the moving of the control element includes arranging the control element at least partially around a backrest bolt mounted between the first and second fitting parts, the control element is a control plate, the installing of the control plate includes positioning the backrest bolt in an outwardly open socket of the control plate, and the socket extends radially outward from proximate a center of the control plate to an outer circumference of the control plate.

28. A method according to claim 27, wherein the plurality of locking elements consists of two locking elements.

29. A method according to claim 27, wherein the control element is a first control plate, and the method further comprises selecting the first control plate from a plurality of control plates having different circumferential structures.

30. A method according to claim 27, further comprising:

mounting the fitting between a seat part of a vehicle seat and a backrest of the vehicle seat; and then operating the fitting to adjust an inclination of the backrest relative to the seat part.

31. A method of assembling a vehicle-seat fitting, comprising:

installing a plurality of locking elements within an at least partially closed chamber of a first fitting part so that the locking elements are operative for interacting with each other and are effective between the first fitting part and a second fitting part for selectively allowing and restricting pivoting of the second fitting part relative to the first fitting part; and then installing a control element, including moving the control element from a position outside of the chamber to a position within the chamber by passing the control element through an opening of the chamber, and attaching the control element to the second fitting part so that the control element is operative for controlling the interaction between the locking elements;

wherein:

the moving of the control element includes arranging the control element at least partially around a backrest bolt mounted between the first and second fitting parts, the control element is a control plate, the installing the control plate includes positioning the backrest bolt in an outwardly open socket of the control plate, the positioning of the backrest bolt includes pushing the control plate onto the backrest bolt at a position adjacent the second fitting part, and the attaching of the control plate to the second fitting part includes fastening the control plate to the second fitting part with at least one fastener, with the fastening occurring after pushing the control plate onto the backrest bolt.

32. A method according to claim 31, wherein the plurality of locking elements consists of two locking elements.

33. A method according to claim 31, wherein the control element is a first control plate, and the method further comprises selecting the first control plate from a plurality of control plates having different circumferential structures.

34. A method according to claim 31, further comprising:

mounting the fitting between a seat part of a vehicle seat and a backrest of the vehicle seat; and then operating the fitting to adjust an inclination of the backrest relative to the seat part.

35. A method of assembling a vehicle-seat fitting, comprising:
- installing a plurality of locking elements within an at least partially closed chamber of a first fitting part so that the locking elements are operative for interacting with each other and are effective between the first fitting part and a second fitting part for selectively allowing and restricting pivoting of the second fitting part relative to the first fitting part; and
- then installing a control element, including moving the control element from a position outside of the chamber to a position within the chamber by passing the control element through an opening of the chamber, and attaching the control element to the second fitting part so that the control element is operative for controlling the interaction between the locking elements;

wherein:
- the control element is a control plate,
- the attaching of the control plate to the second fitting part includes fastening the control plate to the second fitting part with at least one fastener, with the fastening occurring after pushing the control plate onto the backrest bolt, and
- the fastening includes passing the fastener through an installation opening of the first fitting part.

36. A method according to claim 35, wherein the installing of the control plate includes engaging at least one depression of one of the control plate and the second fitting part with at least one elevated portion of the other of the control plate and the second fitting part.

37. A method according to claim 36, wherein the engaging of the depression and the elevated portion includes guiding the control plate relative to the second fitting part.

38. A method according to claim 36, wherein the engaging of the depression and the elevated portion includes securing the control plate to the second fitting part.

39. A method according to claim 35, further comprising:
- mounting the fitting between a seat part of a vehicle seat and a backrest of the vehicle seat; and
- then operating the fitting to adjust an inclination of the backrest relative to the seat part.

40. A method according to claim 35, wherein the control element is a first control plate, and the method further comprises selecting the first control plate from a plurality of control plates having different circumferential structures.

41. A method according to claim 35, wherein:
- the moving of the control plate includes arranging the control plate at least partially around a backrest bolt mounted between the first and second fitting parts,
- the installing the control plate includes positioning the backrest bolt in an outwardly open socket of the control plate, and
- the positioning of the backrest bolt includes pushing the control plate onto the backrest bolt at a position adjacent the second fitting part.

42. A method according to claim 35, wherein the plurality of locking elements consists of two locking elements.

* * * * *